May 12, 1970  O. C. WOODRUFF  3,511,208
FISHING RIG

Filed July 26, 1968  2 Sheets-Sheet 1

INVENTOR.
Oscar C. Woodruff

May 12, 1970     O. C. WOODRUFF     3,511,208

FISHING RIG

Filed July 26, 1968     2 Sheets-Sheet 2

INVENTOR.

Oscar C Woodruff

United States Patent Office 3,511,208
Patented May 12, 1970

3,511,208
FISHING RIG
Oscar C. Woodruff, 3128 Regent, Shreveport, La. 71109
Filed July 26, 1968, Ser. No. 747,868
Int. Cl. B63h *21/26*
U.S. Cl. 115—18
4 Claims

ABSTRACT OF THE DISCLOSURE

An auxiliary power attachment for fishing boats adapted for mounting on the bow of the boat to permit an occupant in the boat to maneuver the same without the use of the hands. The device consists in an electric motor connected to the battery normally used with the boat's engine. The motor is fastened to a hollow shaft pivotally mounted at the bow of the boat which permits the motor to lie in a transporting position on the boat deck, yet permits the same to be swung arcuately over the bow of the boat and into the water. The device includes a remote foot control of the motor speed together with a control of the hollow shaft which may be turned radially to thus position the motor and its propeller to guide the boat.

---

The present invention pertains to a fishing rig and more in particular to a rig adapted to be attached to the front end of a fishing boat to permit a fisherman to maneuver his boat slowly and accurately into fishing spots while keeping both his hands free for fishing.

As any fisherman knows, the normal equipment on a fishing boat includes an outboard motor of adequate horse-power, a battery for starting the motor, gasoline tanks and many items necessary for fishing and for the comfort of the fisherman. With this amount of equipment aboard it is understandable that maneuverability becomes a problem, particularly when moving in and out of tight spots in the narrow confines of a lake or stream. Moreover, the fisherman needs the constant use of both hands and does not like to be bothered about maneuverability of his boat when he is concentrating on fishing.

It is therefore an object of the present invention to provide a fishing rig which permits the fisherman to maneuver his boat with his feet and thus free his hands completely for fishing.

It is another object of the invention to provide a fishing rig which may be attached to the bow of the boat and brought into use whenever desired without interfering with the conventional motor and other equipment attached to the boat's stern.

Another object of the invention is the provision of a rig which utilizes power from the boat's battery for its operation.

Still another object of the invention is the provision of a rack-and-pinion steering mechanism associated with the rig which obviates the need for cables, ropes and pulleys formerly used for this purpose.

Other objects and advantages of the invention will become apparent in the course of the following detailed description when viewed together with the accompanying drawing in which.

Figure 1:
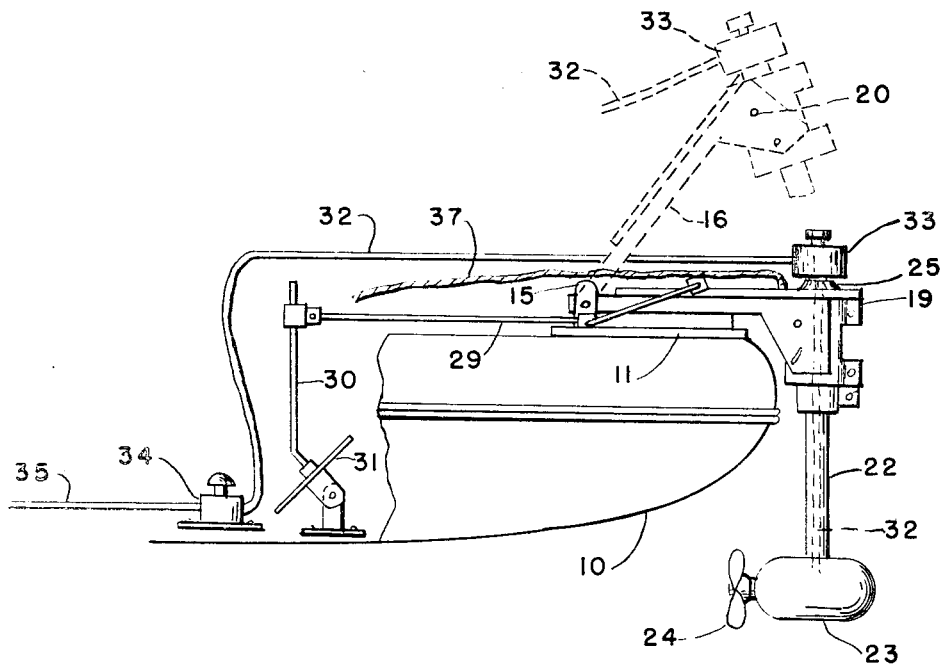
FIG. 1 is a broken view of the forward end of a fishing boat showing the invention as mounted thereon for service.

In the drawings numeral 10 designates a common type of fishing boat which has a portion of the bow decked over. It will be understood that the present invention is to be used on a boat of this type or some provision must be made to support the invention at the extreme forward end of the boat.

Figure 6:
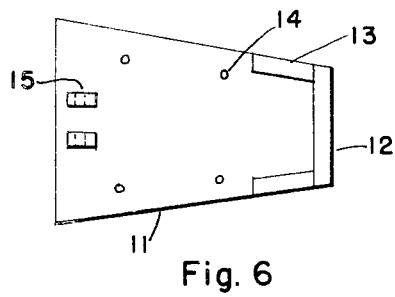
FIG. 6 is a plan view of a metal plate attachable to the bow of the boat and which serves both as a base for the rig and as a fulcrum for the foldable steering column.

Numeral 11 designates a mounting plate (more clearly seen in FIG. 6) and includes pads 12 and 13 together with mounting holes 14. A pivot bracket is shown at 15 whose purpose will be subsequently described.

Figure 3:
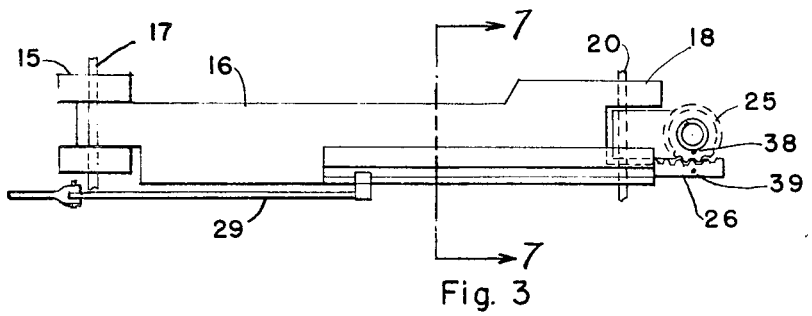
FIG. 3 is a plan view of the steering mechanism.
Figure 8:
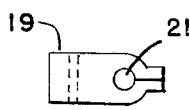
FIG. 8 is a top view of a special casting for supporting the combination steering column and motor support and FIG. 9 is a side elevational view thereof.
Figure 9:
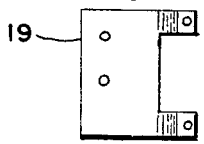

In the plan view of FIG. 3, the pivot bracket 15 is operatively associated with a pivotable support arm 16 the inner end of which is pivotally attached to the bracket 15 by means of a fulcrum pin 17. The outer end of this support arm is provided with a yoke 18 between the legs of which is cradled a special casting 19 illustrated in FIGS. 8 and 9. The casting is pivotally attached to the yoke 18 by means of a second fulcrum pin 20. This pin also permits the folding of the front end of the unit as illustrated in FIG. 1.

Positioned through a hole 21 in the casting 19 is a tubular shaft 22 on the bottom end of which is attached an electric motor 23 and its accompanying propeller 24. At the upper end of the shaft is a gear 25 more clearly seen in FIG. 3. Enmeshed with the gear 25 is a rack 26 positioned along the support arm 16.

Figure 2:
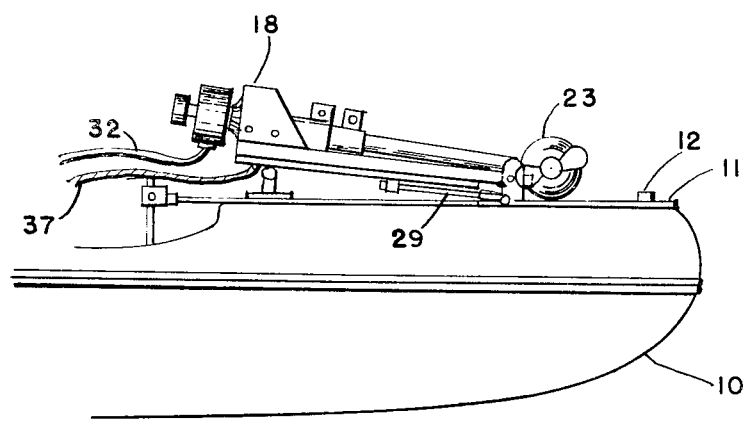
FIG. 2 is a view similar to that of FIG. 1 but showing the invention folded back over the bow of the boat and in its traveling position when not in service.
Figure 7:
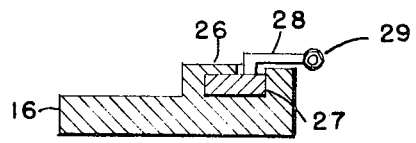
FIG. 7 is a sectional view taken along lines 7—7 of FIG. 3.

In the sectional view of FIG. 7 the rack 26 is made to move within a track 27 in the support arm 16. The extending arm 28 is attached to a linkage rod system 29 as illustrated in FIGS. 1 and 2. Note here, that the linkage is extended back over the deck of the boat and is fastened to an upright rod 30 which, in turn, is rigidly affixed to a pivotal foot pedal 31. Now it can be seen that upon actuation of the foot pedal 31, the rack 26 is moved within its track 27, thus actuating the pinion gear 25, hence rotating the shaft 22 to steer the boat. The electrical wires 32 to the motor are extended down through the hollow shaft 22 at the motor end and at the top are associated with a safety switch 33. The wires 32 are further extended over the deck of the boat and terminate in a foot controlled rheostat 34 in the bottom of the boat. Power from the boat's conventional starting battery (not shown) comes to the rheostat 34 through a wire extension 35.

Figure 4:
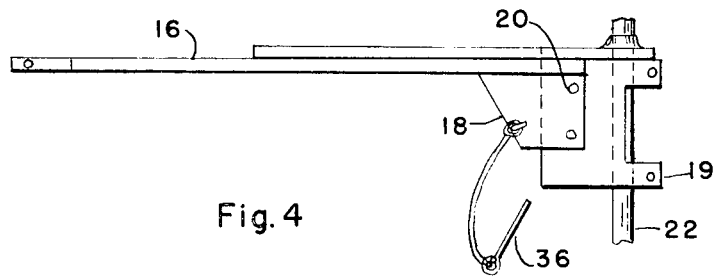
FIG. 4 is a side elevational view of the steering mechanism.
Figure 5:
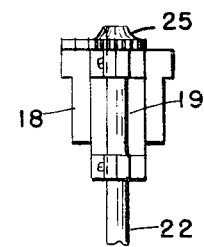
FIG. 5 is an end view thereof.

In FIG. 4 a pin 36 is provided which may be extended through both the yoke 18 and casting 19 to prevent movement of the shaft and the motor with respect to the supporting arm 16. When folding the rig, however, the pin 36 is removed and the rig may be folded to assume the position as illustrated in FIG. 2. Just prior to folding, it is necessary to pull the rack 26 completely away from the pinion gear 25 by means of the linkage 29. Then, by pulling on the rope 37, the rig rises out of the water in the manner illustrated in FIG. 1 and finally made to rest in the completely folded position as illustrated in FIG. 2.

In FIG. 3 it will be noted that the pinion gear 25 and the rack 26 are provided with marks 38 and 39 respectively so that when aligned, the motor 23 will be in the axial plane of the boat and the rack and pinion will be able to rotate the shaft 22 at least 90 degrees in either direction by means of the foot operated pedal 31.

The advantages of the invention can now be seen. Let it be supposed that the fisherman has reached his favorite fishing spot by means of the conventional motor power. He now moves to the front end of the boat and unfolds his special rig in the manner as formerly described. With his feet he is able to maneuver his boat in and direction and at any speed. He may stop, move his boat to the right or left, or keep his position against both wind and wave by his rig—all by foot manipulations and keeping both hands free for fishing. If he cares to move on, he may use his auxiliary power to move or if the distance is considered too great, he merely folds his rig in the manner formerly described and moves to a new spot by means of his conventional motor.

While I have described the invention in detail in a particular embodiment, it is to be understood that this has been by way of example only and that changes could be made in the actual construction without departing from the spirit and scope of the invention as defined by the following claims.

I claim:
1. An auxiliary power attachment for fishing boats having a conventional power unit at the stern end thereof and a starting battery therefor, comprising a mounting plate adapted for mounting at the bow end of the boat, and arm pivotally mounted on said mounting plate, a rotatable shaft pivotally mounted to said arm, an electric motor affixed to and supported by said shaft, said motor being electrically connected to the starting battery of said boat, speed control means for said electric motor, a pinion gear mounted on said rotatable shaft, a rack engageable with said gear for rotating said shaft and hence to turn said motor, linkage means connecting said rack and a foot pedal positioned in said boat, means for raising and lowering said motor into and out of the water to serve as an auxiliary power unit by folding and unfolding said pivotable arm and shaft.

2. The device as claimed in claim 1 wherein said rack and said gear are each provided with indicies which, when aligned, also align said motor with the longitudinal plane of said boat.

3. The device as claimed in claim 1 and including locking means for locking said foldable attachment both in a folded at-rest position and in an extended unfolded working position.

4. The device as claimed in claim 1 wherein said linkage means is also made foldable with a pivotal point correspondingly positioned to that of said pivotally mounted arm.

References Cited
UNITED STATES PATENTS

| | | | |
|---|---|---|---|
| 3,052,204 | 9/1962 | Scivally | 115—18 |
| 3,431,882 | 3/1969 | Irgens | 115—17 |
| 3,450,908 | 6/1969 | Mabuchi | 115—17 |

ANDREW H. FARRELL, Primary Examiner

Dedication 3,511,208.—*Oscar C. Woodruff*, Shreveport, La. FISHING RIG. Patent dated May 12, 1970. Dedication filed Aug. 3, 1972, by the assignee, *Jamajo Industries, Inc.*

Hereby dedicates said patent to the Public for the entire remaining term thereof.

[*Official Gazette February 20, 1973.*]